United States Patent [19]

Cooper et al.

[11] Patent Number: 5,854,633

[45] Date of Patent: Dec. 29, 1998

[54] METHOD OF AND SYSTEM FOR DYNAMICALLY ADJUSTING COLOR RENDERING

[75] Inventors: Michael R. Cooper, Boca Raton; Mark Hamzy, Boynton Beach; Matt Rutkowski, Plantation; Mark Vanderwiele, Boca Raton, all of Fla.

[73] Assignee: International Business Machines Corporation, Armonk, N.Y.

[21] Appl. No.: 495,139

[22] Filed: Jun. 28, 1995

[51] Int. Cl.⁶ .................................................. G06T 11/40
[52] U.S. Cl. ........................... 345/431; 345/154; 358/523
[58] Field of Search .................... 395/131; 358/515–521, 358/523; 345/430–1, 432, 150–154, 515–24

[56] References Cited

U.S. PATENT DOCUMENTS

| 4,814,867 | 3/1989 | Tsuda ........................................ 358/80 |
| 5,253,048 | 10/1993 | Mori et al. .............................. 358/524 |
| 5,329,385 | 7/1994 | Washio .................................... 358/515 |
| 5,337,166 | 8/1994 | Ikegami ................................... 358/518 |
| 5,345,320 | 9/1994 | Hirota ...................................... 358/518 |
| 5,377,025 | 12/1994 | Spaulding et al. ...................... 358/518 |
| 5,384,582 | 1/1995 | Keith et al. .............................. 345/199 |
| 5,384,901 | 1/1995 | Glassner et al. ......................... 345/431 |

OTHER PUBLICATIONS

Long, Ben, "Collage 2.0.1 makes layered images easier to construct", *MacWeek, v8, n47, p31(2), Dec. 5, 1994.*
Software Review, Collage 1.0.1, *Macworld, Jul. 1994, p. 62.*
Burk, Ron, "Software Development '94 conference report", *Windows–DOS Developer's Journal, v5, n6, p33(6)Jun., 1994.*

Foley, James D., et al, "Computer Graphics: Principles and Practices", *Addison–Wesley Publishing Co., 2nd ed. pp. 167–171, 1990.*

"ColorSync Utilities" Apple Computer, Inc. Developers Notes, Jul. 15, 1993.

*Primary Examiner*—Rudolph J. Buchel, Jr.
*Attorney, Agent, or Firm*—Mark S. Walker; Andrew J. Dillon

[57] ABSTRACT

A data processing system that is capable of providing dynamically adjusted renderings of images is disclosed. The data processing system uses an operating system that provides a graphical user interface (GUI) displayable in a first color scheme. The data processing system further includes a least one, preferably more, device drivers supporting a second color scheme. More particularly, the system performs dynamically adjusted rendering from the first color scheme to the second color scheme. To perform such rendering, the system renders a graphic primitive in the first color scheme to a second color scheme and stores the rendered graphic primitive as a new second color scheme surface. This is repeated iteratively until such a time as the rendered surface has been completed. Preferably, the second color scheme is CYAN, MAGENTA, and YELLOW (CMY) and may further include BLACK (K).

21 Claims, 3 Drawing Sheets

5,854,633

METHOD OF AND SYSTEM FOR DYNAMICALLY ADJUSTING COLOR RENDERING

BACKGROUND OF THE INVENTION

1. Technical Field

The present invention is directed towards a data processing system having a graphical user interface (GUI) and, more particularly, to a data processing system that is able to render colors used for the GUI into colors different than those used by the GUI for other device drivers. More specifically still, the present invention is directed towards a data processing system operating under a graphical user interface in one color mode that is able to convert the color mode to an alternative color mode that requires less memory while providing compatibility and flexibility for those device drivers operating within the data processing system.

2. Description of the Related Art

As display system for a video system, such as a data processing system, displays discrete colors at individual pixels. The color represented at each pixel is typically formed from a plurality of phosphors, each generating a color amplitude response to an activating electron beam. A typical set of phosphors may represent the primary colors, red, blue, and green (RBG) from which a complete color spectrum may be formed. High resolutions of digital representations of color images present 24 bit words, 8 bits each for the three colors, to encode the color to be presented. This representation provides over 16 million discrete colors.

A 24 bit color representation, however, is beyond the capability of most display systems, particularly when a real time video capability is desired. A conventional display system uses only an 8 bit word for color representation which enables 256 colors to be selected to represent an image. The 8 bit word does not, however, directly represent a color, but an address in a look-up table (LUT). The LUT then contains 24 bit representations at each of the 256 addresses. The display system assigns each actual color to one of the stored colors in the LUT and the stored color is actually used to generate the color displayed by each pixel during the raster generation of a color display.

To present a high resolution color image, an optimum set of colors must be selected to represent the image. A method that will compress a color image for LUT decompression typically has the following features:

(1) It must produces from a list of colors in their image a second smaller list of colors (the representative LUT colors); the representative colors need not be present in the original image.

(2) It must replace each of the original colors with an index into the LUT.

In one approach to color image quantization, a fixed set of color representations are stored in the LUT. The fixed set of colors may be uniformly spaced or may be based on a statistical distribution of the input colors.

Data processing systems that have graphical user interfaces and use an RGB based primitives to represent colors on the display must also depend on a hardware driver to provide RGB to CMY(K) conversion. CMY(K) represents cyan, magenta, and yellow (and black). The CMY(K) devices generate variable output given the same RGB primitives to manipulate and render because of the wide variety of software algorithms used. In order to keep real colors, most drivers report to the GUI that they are 8 or 24 bit RGB, which increases memory usage from two to six times normally required since a CMY(K) device typically uses only 4 bits per pixel element (PEL).

Unfortunately, there is no method or system that provides a GUI that has a common quality output across differing CMY(K) devices. Further, the method or systems do not allow users to provide input and fine adjustments that are passed to the GUI to use while rendering from the RGB to the CMY(K) colors. Additionally, in converting between RGB and CMY(K) to maintain original bit map quality, extra memory is typically required.

Accordingly, what is needed is a system and method for rendering RGB to CMY(K) devices for all primitives that also optimizes memory usage while maintaining real color quality. Additionally, what is needed is a user or device interface for rendering adjustments to achieve consistent quality rendered output across different CMY(K) devices. This interface should also provide hue, saturation, and value adjustments as well as gamma with bias adjustments.

SUMMARY OF THE INVENTION

It is therefore one object of the present invention to provide a data processing system having a graphical user interface.

It is another object of the present invention to provide a data processing system that is able to render colors used for the graphical user interface into colors different than those used by the graphical user interface for other device drivers.

It is yet another object of the present invention to provide a data processing system operating under a graphical user interface in one color mode that is able to convert the color mode to an alternative color mode that requires less memory while providing compatibility and flexibility for those device drivers operating within the data processing system.

According to the present invention, a data processing system that is capable of providing dynamically adjusted renderings of images is disclosed. The data processing system uses an operating system that provides a graphical user interface (GUI) displayable in a first color scheme. The data processing system further includes at least one, preferably more, device drivers supporting a second color scheme. More particularly, the system performs dynamically adjusted rendering from the first color scheme to the second color scheme. To perform such rendering, the system renders a graphic primitive in the first color scheme to a second color scheme and stores the rendered graphic primitive as a new second color scheme surface. This is repeated iteratively until such a time as the rendered surface has been completed. Preferably, the second color scheme is CYAN, MAGENTA, and YELLOW (CMY) and may further include BLACK (K).

Before the rendering of the graphic primitive is performed, the system can determine whether to render the graphic primitive from a first color to either a second, or alternatively, a third color scheme. The system then renders the graphic primitive iteratively in the third color scheme, if selected, until the rendered surface is obtained. This third color scheme may be a RED, GREEN, BLUE (RGB) surface. Once the primitive has been rendered into the third color scheme, the system then may render the third color scheme surface into the second color scheme surface.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
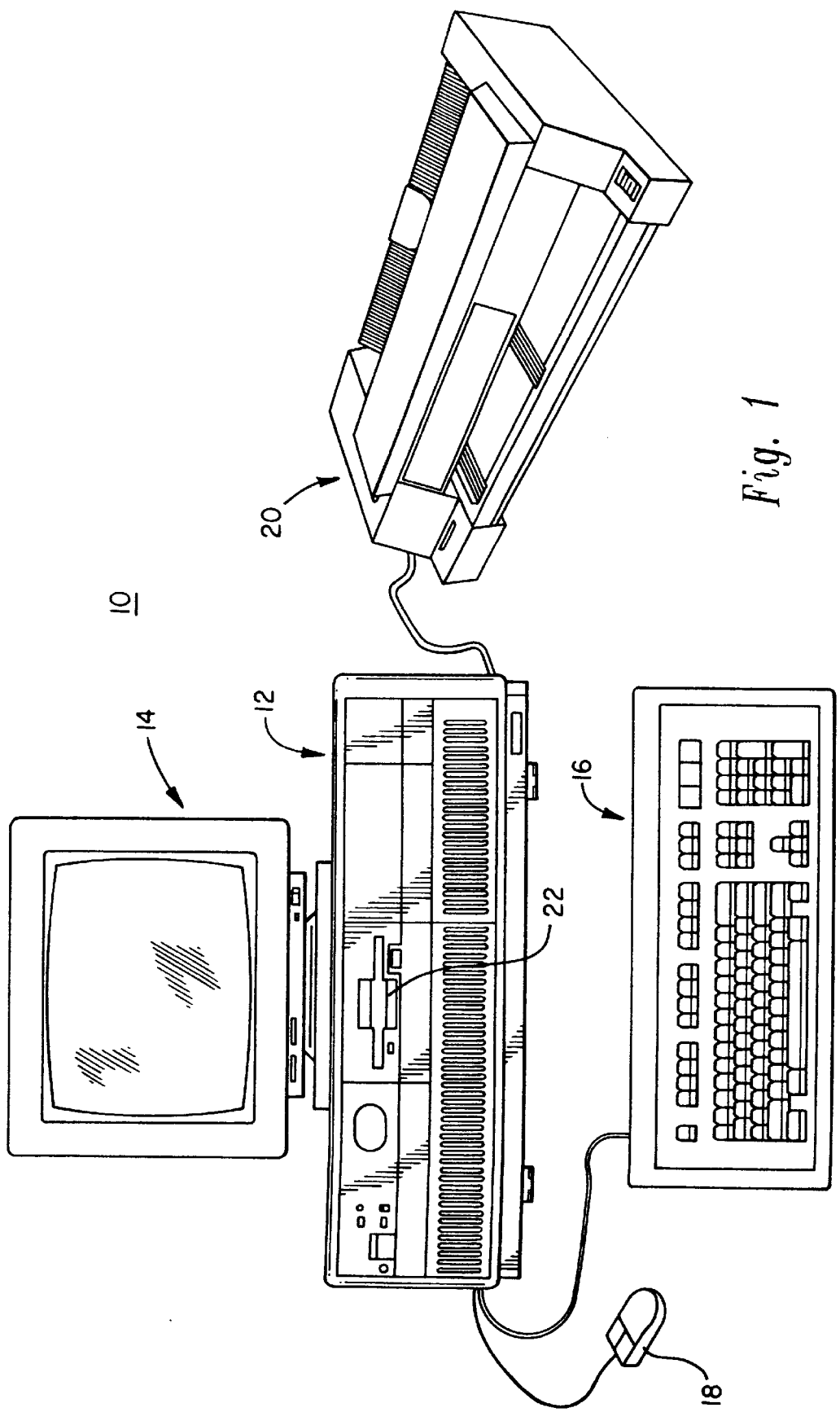
FIG. 1 depicts in accordance with an illustrative embodiment of the present invention a data processing system in which the present invention can be employed.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
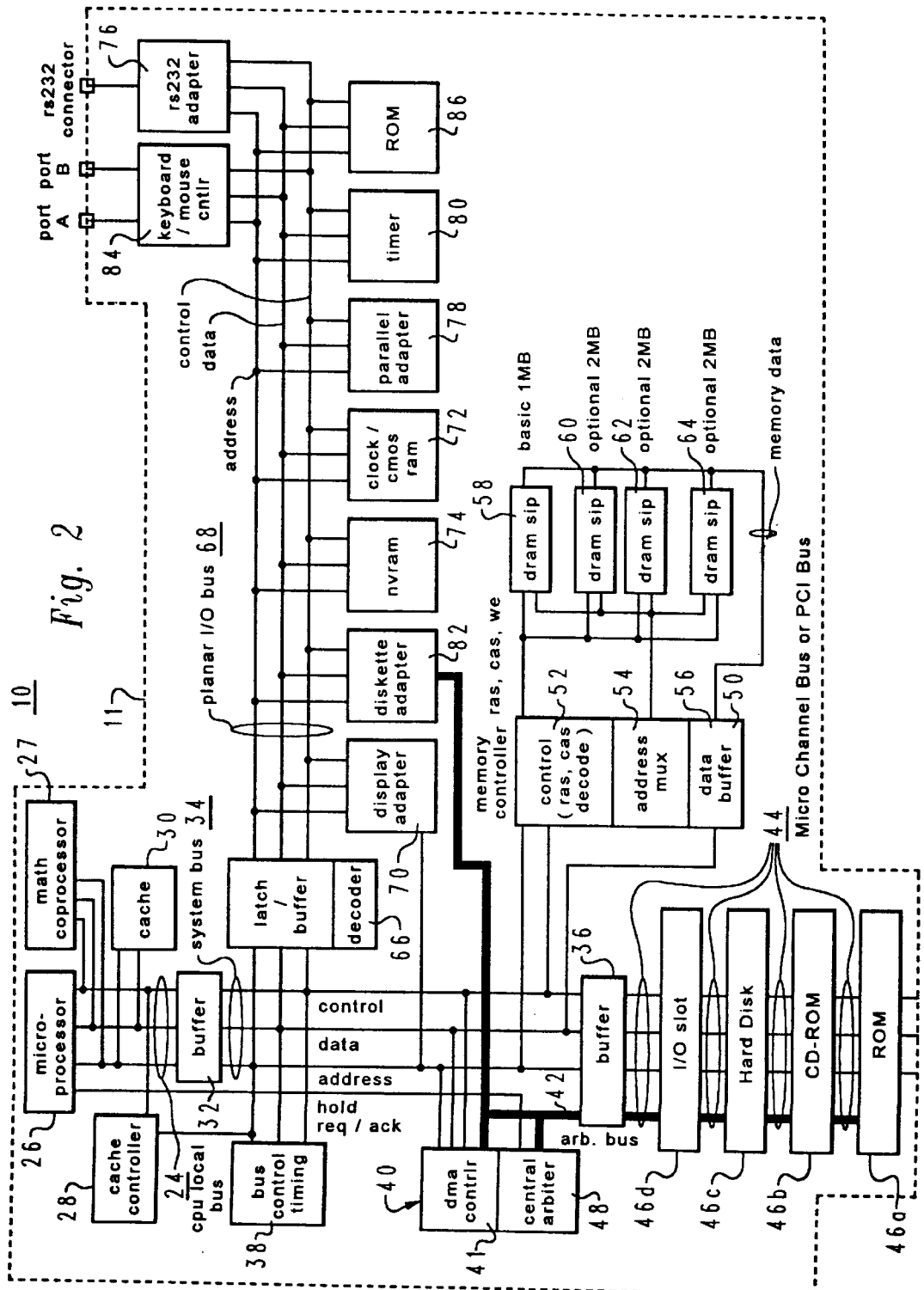
FIG. 2 is a block diagram of a personal computer system illustrating the various components of a personal computer system.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Power PC microprocessor, which is sold by IBM Corporation. "Power PC" is a trademark of IBM Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80386, 80486 or Pentium microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus. Connected to bus 44 are a plurality of I/O slots 46a–46d for receiving adapter cards, which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Typical operating systems only support rendering for packed pixel RGB devices. The rendering device disclosed in the present invention supports both CMY (cyan, magenta, and yellow) and CMY(K) (CMY and black) devices in interleaved and planar formats. First, a device driver supplies information to the operating system in the computer as to how it wants to have its surface rendered during each context. The information supplied by the device driver is typically that as shown below.

| Bit Flags in System Simulation Quiried from the Device Driver | |
|---|---|
| DEFAULT/OVERRIDE | 7 6 5 4 3 2 1 0 |
| SYSTEM RESERVED | R R |
| RGB/CMYK DEVICE | X |
| KCMY/CMY* | X |
| PLANAR/INTERLEAVE* | X |

*Only relevant if the RGB/CMYK DEVICE bit is set.

Next, the device driver supplies its given structure as shown below:
Hue Adjust
Saturation Adjust
Value Adjust
Red Gamma Value
Red Gamma Bias
Green Gamma Value
Green Gamma Bias
Blue Gamma Value
Blue Gamma Bias The device driver still reports to the system that it logically supports 24 bit per pel (pixel element) color. This assures that real color is preserved down to the rendering function. The device driver also uses an external bit map format. By doing so, the system does not need to convert the external bit map formats to the internal logical format, thereby letting the conversions take place during rendering and conserving memory by not converting to the logical 24 bit per PEL internal representation.

Next, the driver supplies the system with a linear memory address of the surface's size to perform CMY(K) rendering. The system then renders, using a dithering technique from an RGB format to a CMY(K) format, to this surface, and then the driver downloads the rendered image to its hardware.

In the illustrative embodiment described below and in FIG. 3, a color Tessalation dithering technique is described. It will be obvious to those skilled that other dithering algorithms such as pattern based or error diffusion dithering algorithms, can be used to implement the invention. The data processing system renders from 1 bit per pixel (bpp), 4 bpp, 8 bpp, or 24 bpp RGB formats to CMY(K) formats. For 1, 4, or 8 bpp, the system generates a color matrix table (CMT), or look-up table (LUT), by looping through the supplied color table and converting to a % black, % white, % color 1, % color 2, color 1, color 2. Then, for each color, the rendering: 1) applies gamma with bias adjustments to the RGB value to convert adjusted RGB to Q saturation and value (HSV); 2) applies HSV adjustments; and 3) calculates CMT percentages from adjusted HSV.

After the CMT has been generated, then the system starts rendering the destination pixels by taking the indexed value of the source and applying its CMT information to the destination. The application of the CMT to the test destination is by way of a first level 16×16 magic square to retrieve a weighted value. The magic square is a weighted dither pattern with 256 levels. Next, this value is applied to the CMT for the respective CMY(K) value. An example, of a sample color table with three indexes is shown in the table below.

| | | CMT Values | | | | | |
|---|---|---|---|---|---|---|---|
| Table Index | Color Table Value | % B | % W | % C1 | % C2 | Color 1 | Color 2 |
| 001 | 0x 80 00 00 | 050 | 000 | 050 | 000 | CLR_RED | CLR_NONE |
| 002 | 0x FF 00 00 | 000 | 000 | 100 | 000 | CLR_RED | CLR_NONE |
| 003 | 0x 80 80 80 | 050 | 050 | 000 | 000 | CLR_NONE | CLR_NONE |

This is an example of the mappings between the color table value and its respective CMT weights and colors.

Then, a modulus 16 of the destination x and y positions is used to retrieve a weighted value between 0 and 255. The weighted value of 0 to 255 represents which color the pell is determined to be (B, W, C1, C2). Then, the system compares the CMT weights to the value returned from the magic square to obtain the current dithered PEL value: BLACK, WHITE, RED, MAGENTA, GREEN, YELLOW, CYAN, BLUE.

For example, if the value returned above is 80 hex for table index 001, (see above table), then the destination color is RED; otherwise, the color is BLACK. Index 3 is mapped to gray, notice that the CMT values are 50% black and 50% white, which would give an alternative dither pattern that results in medium gray, as the RGB weights indicate.

The system is now ready to update the surface at the destination location. The system update three to four 1 bit per PEL planes depending on the CMY(K) format. Each plane is associated with a CMY(K) primary. The RGB primaries are actually a combination of CMY:

RED=YELLOW & MAGENTA
GREEN=CYAN & YELLOW
BLUE=MAGENTA & CYAN
BLACK=BLACK on CMYK/YELLOW & CYAN & MAGENTA on CMY
WHITE=No Update The offset of each plane is determined by the width and height of the surface area and whether it is interleaved or planar format.

With applications for a 24 bpp, no color table is available so the system optimizes calculating the colors in advance by calculating all CMT values on a PEL-per-PEL basis; otherwise, the procedure for the 1, 4, and 8 bpp is followed.

Figure 3:
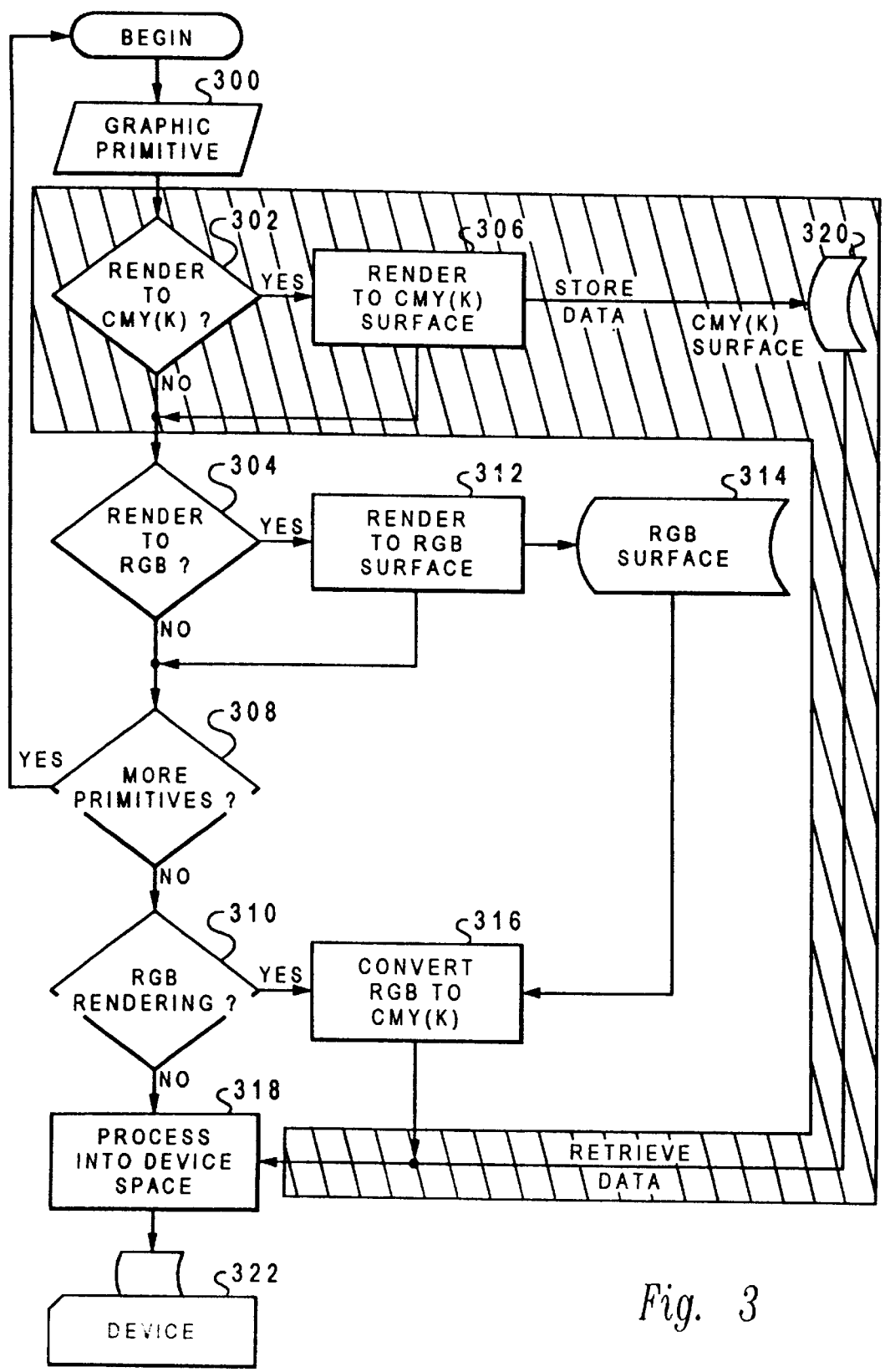
FIG. 3 depicts a block diagram of an illustrative method for providing dynamically adjusted CMY(K) rendering.

FIG. 3 is a block diagram of the method for providing dynamically adjusted CMY(K) rendering. First, in step 300, the system establishes a graphic primitive. In step 302, the system then decides whether to render the primitive to a CMY(K) surface and if not proceeds to step 304; otherwise, the system proceeds to step 306. In step 304, the system decides whether to render the graphic primitive to an RGB surface and if not, proceeds to step 308; otherwise, the system proceeds to step 312. In step 308, the system then determines whether to add more primitives and if so returns to step 300, otherwise, the system proceeds to step 310 where the system determines whether to begin the RGB rendering.

If, in step 304, the system proceeds to render the graphic primitive to an RGB surface, the system, in step 312 renders the primitive to an RGB surface and then returns to 308 and stores the RGB surface in a data store in step 314. To preserve color data, all images are rendered at 24 bpp (8 RED, 8 GREEN, 8 BLUE). After the rendered graphic primitive is stored in step 314, the system proceeds to step 316 where it converts the RGB surface to a CMY(K) surface. Afterwards, the system proceeds to step 318 where the system processes the converted graphic into the device space. The rendered primitive is then sent to the desired device in step 322.

Once the system determines that the primitive should be rendered to CMY(K) (step 302), the system, in step 306, renders the primitive to the CMY(K) surface. Rendering the primitive to CMY(K) at this stage allows the system to use the appropriate render/dither technique on a per graphic primitive basis. Once the rendering is completed, the data is stored in a data store (step 320) as the new CMY(K) surface. Again, if more primitives are needed, as determined in step 308, they are generated and then proceed through steps 302 through 322. The CMY(K) surface size is stored a 4 bpp, thereby reducing the storage requirements by a factor of six (6) over the existing modes. This allows the CMY(K) rendering method to increase throughput by eliminating conversion from the RGB surface to the CMY(K) surface. Once the primitive is completely rendered to the CMY(K) surface, the data is retrieved for processing to the data to the device space in step 318 before being outputted to the device in step 322.

While the invention has been particularly shown and described with reference to an illustrative embodiment, it will be understood by those skilled in the art that various changes in form and detail may be made therein without departing from the spirit and scope of the invention.

We claim:

1. In a data processing system having an operating system that provides for a graphical user interface (GUI) displayable in a first color scheme, and further including at least one device driver supporting a second color scheme, a method for providing dynamically adjusted rendering from said first color scheme to said second color scheme, comprising the steps of:
    rendering a graphic primitive in said first color scheme to a second color scheme;
    storing said rendered graphic primitive in a data store as a new second color scheme surface;
    repeating said rendering step and said storing step until a completed rendered surface is achieved; and
    processing said completed rendered surface utilizing said at least one device driver.

2. The method according to claim 1 wherein said second color scheme is a CMY surface.

3. The method according to claim 2 wherein said CMY surface further comprises a K surface CMY(K).

4. The method according to claim 1 comprising the step before said rendering a graphic primitive step of:
    determining whether to render said graphic primitive of said first color scheme to either said second color scheme or a third color scheme; and
    rendering said graphic primitive to said third color scheme if it is determined not to render said graphic primitive in said first color scheme.

5. The method according to claim 4 wherein said third color scheme is an RGB surface.

6. The method according to claim 4 further comprising the step of repeating said rendering step to said third color scheme until a completed rendered third color scheme surface is achieved.

7. The method according to claim 6 further comprising the step of:
    rendering said completed rendered third color scheme surface to said second color scheme surface.

8. A computer program product for use with a graphics display device, said computer program product comprising:
    a computer usable medium having computer readable program code means for providing a graphical user interface displayable in a first color scheme and further including at least one device driver supporting a second color scheme and being able to provide dynamically adjusted renderings from said first color scheme to said second color scheme;
    computer readable program code means, for rendering a graphic primitive in said first color scheme to said second color scheme;

computer readable program code means for determining when a completed rendered second color scheme surface has been achieved; and computer readable program code means for processing said completed rendered second color scheme surface utilizing said at least one device driver.

9. The computer program product according to claim 8 wherein said second color scheme is a CMY surface.

10. The computer program product according to claim 8 wherein said CMY surface further comprises a K surface CMY(K).

11. The computer program product according to claim 8 comprising:

computer readable program code means for determining whether to render said graphic primitive of said first color scheme to either said second color scheme or a third color scheme; and computer readable program code means for rendering said graphic primitive to said third color scheme.

12. The computer program product according to claim 11 wherein said third color scheme is an RGB surface.

13. The computer program product according to claim 11 further comprising computer readable program code means for determining whether a completed rendered third color scheme surface is achieved.

14. The computer program product according to claim 13 further comprising:

computer readable program code means for rendering said completed rendered third color scheme surface to said second color scheme surface.

15. A data processing system comprising:

means for providing a graphical user interface displayable in a first color scheme and further comprising at least one device driver supporting a second color scheme and being able to provide dynamically adjusted renderings from said first color scheme to said second color scheme;

means for rendering a graphic primitive in said first color scheme to said second color scheme;

means, coupled to said rendering means and said storing means, for determining when a completed rendered second color scheme surface has been achieved; and means for processing said completed rendered second color scheme surface utilizing said at least one device driver.

16. The system according to claim 15 wherein said second color scheme is a CMY surface.

17. The system according to claim 15 wherein said CMY surface further comprises a K surface CMY(K).

18. The system according to claim 15 comprising:

means for determining whether to render said graphic primitive of said first color scheme to either said second color scheme or a third color scheme; and means for rendering said graphic primitive to said third color scheme if it is determined not to render said graphic primitive in said first color scheme.

19. The system according to claim 15 wherein said third color scheme is an RGB surface.

20. The system according to claim 15 further comprising means for repeating said rendering step to said third color scheme until a completed rendered third color scheme surface is achieved.

21. The system according to claim 15 further comprising:

means for rendering said completed rendered third color scheme surface to said second color scheme surface.

* * * * *